Figure 1:
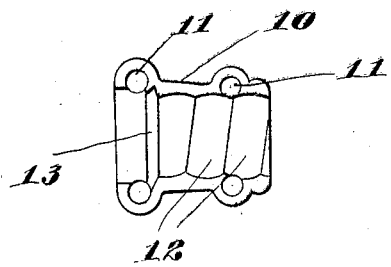

Aug. 12, 1924.

A. T. SAMPSON 1,505,077

THREADLESS COUPLING FOR PIPES AND THE LIKE

Original Filed Dec. 15, 1919

Inventor
Archibold T. Sampson
by James R. Hodder
Attorney

Patented Aug. 12, 1924.

1,505,077

UNITED STATES PATENT OFFICE.

ARCHIBALD T. SAMPSON, OF LYNN, MASSACHUSETTS, ASSIGNOR TO SAMPSON AXCESS SYSTEM, INC., OF LYNN, MASSACHUSETTS, A CORPORATION OF MASSACHUSETTS.

THREADLESS COUPLING FOR PIPES AND THE LIKE.

Original application filed December 15, 1919, Serial No. 344,927. Divided and this application filed April 21, 1923. Serial No. 633,757.

*To all whom it may concern:*

Be it known that I, ARCHIBALD T. SAMPSON, a citizen of the United States, and resident of Lynn, in the county of Essex and State of Massachusetts, have invented an Improvement in Threadless Couplings for Pipes and the like, of which the following description, in connection with the accompanying drawings, is a specification, like letters on the drawings representing like parts.

My present invention relates to pipe joints or couplings, and more particularly to threadless pipe joints or couplings for use in systems of electrical installation.

In my copending application for an improved system of electrical construction and installation, Serial No. 166,813, filed May 7, 1917, I have described the manner of tapping the main conduits of the system without the necessity of tearing out and reinstalling portions of the system whenever an addition is to be made thereto. My present application is a division of my copending application for a threadless pipe joint and coupling, Serial No. 344,927, filed December 15, 1919, filed as a division of application Serial No. 166,813 now Patent No. 1,452,169 of April 17, 1923.

In a system of electrical installation for buildings, factories and the like as now employed with the open conduit work, it is customary to have the separate lengths of pipe or conduit cut and threaded together with correspondingly threaded unions and to cut and thread the abutting ends of the conduit at every outlet box or branch, whether switch, cutout, light or like cord pendants. This method is both expensive and objectionable, it being almost impossible to line up such fittings satisfactorily, and to have them sustain the usual fixtures put upon them, as the continuous cutting and threading of the conduit pipes greatly weakens the mechanical strength of same. Furthermore, each time a conduit is cut and threaded, the twisting and turning of the threaded connections loosens the entire line. Wherever current is taken off, the main wires of the conduit, it has heretofore been customary to take down the adjacent sections of pipe and cut off the same, thread and apply the threaded outlet box and refit the pipes thus prepared, disalining the entire adjacent piping.

My present invention enables the abutting ends of conduit pipes or the junction of a conduit and an outlet box to be made without threaded connections, to ensure increased strength at all such joints, and in addition thereto, providing a substantially waterproof, dustproof and perfect electrical bonding of the pipe sections, outlet boxes, and the like forming a conduit.

Further features of the invention, important details of construction and novel arrangements and advantages will be hereinafter more fully pointed out and claimed.

Figure 2:
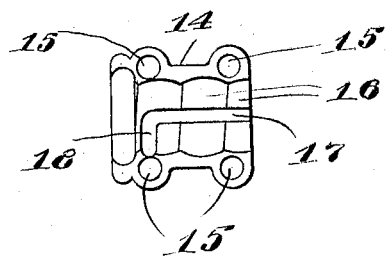

Referring to the drawings illustrating preferred embodiments of the invention, and the novel features of construction preferably employed therein, Fig. 1 is a plan view of my improved coupling, as used in connection with flexible armored cable, and Fig. 2 is a plan view of a modified form of the coupling shown in Fig. 1.

In Fig. 1, I have illustrated a form of coupling suitable for use in connecting flexible armored conduit to an outlet box of the character shown and described in my Patent No. 1,452,169, above referred to. This coupling is formed of cooperating members 10 having registering holes 11 through which bolts may pass to clamp the members 10 together. Thread-like depressions 12 similar in size and shape to the exterior surface of the armored cable, are formed in the members 10 and near one end is a groove 13 into which the flared out end of the armored cable is clamped.

Where it is desirable or advisable to employ a strengthening wire in connection with the armored cable, as described in my application, Patent No. 1,452,169, above referred to, I provide the form of coupling illustrated in Fig. 2, which is similar to the form illustrated in Fig. 1, in that it has a body portion 14, holes 15, thread-like depressions 16, but has in addition a groove 17 which extends longitudinally of the body and then at right angles thereto, as designated at 18, this right angled portion constituting the locking device for locking the strengthening wire to the coupling.

While I have shown and described the preferred embodiment of my invention, it is to be understood that I may vary the size, shape and arrangement of parts within considerably wide limits without departing from the spirit of the invention.

My invention is further described and defined in the form of claims as follows:

1. An improved coupling for flexible armored cable, comprising non-threaded clamping means, helical grooves therein for cooperating with the armor, and a longitudinal groove in one of said non-threaded clamping means for retaining a strengthening means for the cable in position.

2. An improved coupling for flexible cables, comprising non-threaded clamping means, helical grooves therein for cooperating with the armor, a longitudinal groove in one of said non-threaded clamping means for retaining a strengthening means for the cable in position, and a right angled extension for said groove for locking the strengthening means for the cable to the clamping means.

3. An improved coupling for flexible cables, comprising non-threaded clamping means, helical grooves therein for cooperating with the armor, and a right angled groove in one of said non-threaded clamping means for positioning and locking a strengthening means for the cable in position in the clamping means.

In testimony whereof, I have signed my name to this specification.

ARCHIBALD T. SAMPSON.